United States Patent
Haflinger et al.

(10) Patent No.: US 6,199,969 B1
(45) Date of Patent: Mar. 13, 2001

(54) METHOD AND SYSTEM FOR DETECTING NONFUNCTIONAL ELEMENTS IN AN INK JET PRINTER

(75) Inventors: James J. Haflinger, Rancho Santa Fe; David A. Neese, Escondido; Warren Free, Anaheim; David M. Dull, San Diego, all of CA (US)

(73) Assignee: Encad, Inc., San Diego, CA (US)

( * ) Notice: Subject to any disclaimer, the term of this patent is extended or adjusted under 35 U.S.C. 154(b) by 0 days.

(21) Appl. No.: 09/127,398

(22) Filed: Jul. 31, 1998

Related U.S. Application Data (60) Provisional application No. 60/055,080, filed on Aug. 1, 1997.

(51) Int. Cl.$^7$ .................................................. B41J 29/393
(52) U.S. Cl. ......................... 347/19; 347/49; 347/5; 324/678; 324/771; 324/549
(58) Field of Search ..................... 347/19, 49, 5; 324/678, 771, 549; 346/76

(56) References Cited

U.S. PATENT DOCUMENTS

| | | | |
|---|---|---|---|
| 4,595,935 | * 6/1986 | Brooks et al. | 346/76 |
| 4,748,453 | 5/1988 | Lin et al. | |
| 4,963,882 | 10/1990 | Hickman . | |
| 4,965,593 | 10/1990 | Hickman . | |
| 4,967,203 | 10/1990 | Doan et al. | |
| 4,996,487 | * 2/1991 | McSparran et al. | 324/549 |
| 4,999,646 | 3/1991 | Trask . | |
| 5,124,720 | 6/1992 | Schantz . | |
| 5,789,934 | * 8/1998 | Kolkowski et al. | 324/771 |
| 5,852,369 | * 12/1998 | Katsuma | 324/678 |
| 6,089,693 | * 7/2000 | Drake et al. | 347/19 |

FOREIGN PATENT DOCUMENTS

| | | |
|---|---|---|
| 0 394 699 A1 | 3/1990 | (EP) . |
| 0 694 396 A2 | 1/1996 | (EP) . |
| 0 855 270 A2 | 7/1998 | (EP) . |
| 0 863 004 A2 | 9/1998 | (EP) . |
| 63-067164 | 3/1988 | (JP) . |
| 03256755 | 11/1991 | (JP) . |
| 07285225 | 10/1995 | (JP) . |
| WO 96/32263 | 10/1996 | (WO) . |
| WO 98/40222 | 9/1998 | (WO) . |

* cited by examiner

*Primary Examiner*—John Barlow
*Assistant Examiner*—Cesar G. Lago
(74) *Attorney, Agent, or Firm*—Knobbe, Martens, Olson & Bear, LLP

(57) ABSTRACT

A method and system for detecting a nonfunctional element in an ink jet printhead is disclosed. The ink jet printer system includes: a switching power supply, coupled to the inkjet printhead, for supplying power to the printhead; an output capacitor, coupled to an output of the switching power supply, for storing a dc voltage therein; a bleed resistor, coupled in parallel to the output capacitor, for discharging current from the output capacitor; an output shifting circuit, coupled to the switching power supply, for shifting the dc voltage level across the output capacitor between a low state and a high state; and a sensor, coupled to the output of the switching power supply, for detecting when the switching power supply is switching, wherein an element of the printhead is tested by measuring a test current discharging from the output capacitor when the element is activated and comparing the measured test current with a reference current which discharges from the output capacitor through the bleed resistor. The method includes: supplying regulated power to the printhead; storing the regulated power in a capacitor so as to provide a dc voltage across the capacitor; shifting the dc voltage level stored in the capacitor between a low state and a high state; measuring a test current discharging from the capacitor when an element of the printhead is activated; measuring a reference current discharging from the capacitor through a bleed resistor, when no elements of the printhead are activated; and comparing the measured test current with the reference current.

14 Claims, 4 Drawing Sheets

METHOD AND SYSTEM FOR DETECTING NONFUNCTIONAL ELEMENTS IN AN INK JET PRINTER

RELATED APPLICATIONS

This application claims priority to a U.S. provisional application entitled, "Open Jet Compensation During Multi-Pass Printing," U.S. application Ser. No. 60/055,080, and filed on Aug. 1, 1997.

BACKGROUND OF THE INVENTION

1. Field of the Invention

The invention relates to multi-pass ink jet printing. More particularly, the invention relates to a method and system for detecting one or more failed ink jets in an ink jet printer.

2. Description of the Related Technology

A basic premise of ink jet printers is that all ink jets must "fire" properly (i.e., eject ink droplets) or the quality of the present image may be degraded. The detection of nonfunctional ink jets, otherwise referred to herein as "open jet detection," is a method of determining which jets within a printhead cartridge are electrically nonfunctional. This electrical non-functionality can result from open traces, damaged drop ejection resistors, changed resistance values, or poor contact between the cartridge and a "flex circuit" which provides control signals to the cartridge. All of these errors may cause one or more jets of a printhead cartridge to not fire, or fire improperly, resulting in anomalies in the printed image.

Defective jets can also result from clogged jet nozzles. Current open jet detection methods are unable to electronically detect clogged jets that are still electrically correct. However, by executing a prime printing pattern using a printhead cartridge under test, and observing the printed results, a user may identify clogged jets and manually input the address or reference designation of each clogged jet into a list of defective or nonfunctional jets. The list of defective or nonfunctional jets, otherwise referred to herein as the "open jet list," is a record of all nonfunctional jets in the respective printhead cartridge. By updating the open jet list, a user of the ink jet printer may be notified as to when a printhead cartridge has an unacceptable number of nonfunctional jets. Additionally, the open jet list may be utilized to update the print masks, or jet group masks, of a printhead cartridge which is configured for multi-pass mode printing, such that one or more of the remaining functional jets in the printhead cartridge may compensate for the one or more defective jets in that printhead cartridge. This method and system for compensating for defective jets with the remaining functional jets in a printhead cartridge is described in greater detail in a co-pending, commonly-owned U.S. patent application entitled, "Open Jet Compensation During Multi-Pass Printing," application Ser. No. 09/127,397, filed currently herewith, and which is incorporated by reference herein.

A common way of measuring current in a circuit is to measure the voltage across a resistor in series with the circuit. Prior art methods of detecting nonfunctional jets have utilized this concept to measure current through printhead circuitry as one or more jets in a printhead cartridge are fired. For example, assume that each of four cartridges has four sets of 14 jets. Firing all the jets requires a sequence of 14 separate firings for the 14 jets in each set. During testing, only one jet in each set of jets is turned on at any instant in time. There is a resistor in series with each set of jets for each cartridge for a total of 16 series resistors. The voltage drop across a series resistor is due to a single jet firing. However, if no jet in that set is firing, the voltage drop will be zero. The voltage drop across each of the series resistors is typically connected through a diode to a common point and compared to a reference voltage. The output from the comparison is an indication of whether a jet is properly functioning. By firing each jet one at a time, it can be determined whether each one has electrical continuity.

The above-described method becomes less desirable as the number of jets and, hence, the number of sets of jets, increases, necessitating an increase in the number of series resistors. These series resistors waste energy, generate heat, waste board space and cost money. The prior art method also has limited functionality in that it only indicates that the current through a jet was greater than or less than some predetermined threshold. This type of indication does not distinguish between the different types of problems which may cause an ink jet to misfire, or not fire at all. For example, the prior art method cannot distinguish between a shorted power line, a shorted address line, or a damaged drop ejection resistor in an ink jet.

SUMMARY OF THE INVENTION

The invention provides a method and system in which the current required to fire an ink jet is not measured by measuring the voltage drop across a series resistor, but rather, by measuring the discharge rate of an output capacitor connected to an output of a switching power supply as one or more ink jets are fired. By measuring the discharge rate of the output capacitor after an ink jet has been fired, or after a power line to the ink jet has been turned on, or after an address line to the ink jet has been turned on, and comparing this test discharge rate with a reference discharge rate, the invention provides a very effective and accurate solution to the problem of determining whether there is a defective ink jet, a defective power line, or a defective address line, for example. Once such a determination is made, information regarding a defective element of the printhead may be stored in memory. For example, if a ink jet is determined to be defective, its address may be included in an open jet list which is stored in a memory of the ink jet printer.

As used herein, the term "element" may refer to any component, such as an ink jet, a power line, or an address line within a printhead cartridge, or any other component within an ink jet printhead. Additionally, when an element is said to be "activated," this term may refer to the turning on of a power line or address line, or the firing of an ink jet, or the turning on of any of the various other components in the ink jet printhead cartridge. As used herein, the terms "element" and "activate", and any combination or conjugations thereof, should be given their ordinary broad meaning and scope. Additionally, unless otherwise specified, the term "printhead" is used synonymously and interchangeably with the term "printhead cartridge" which is a well-known term of art.

The method and system of the invention measures the time it takes for power supply capacitors supplying power to one or more ink jet cartridges to discharge a small amount of current. The average current supplied by the capacitors during that time is given by the following equation:

$$I_{average} = C \times (dV/dT) \qquad \text{Equation 1}$$

where C is the capacitance of the power supply capacitors, dV is the change in voltage across the capacitors, and dT is the time measured for the voltage change to occur. A switching power supply which supplies power to the ink jet cartridges is enhanced to provide this measurement capability by the addition of two functions. In a preferred embodiment, a first function increases the quiescent output voltage by an amount equal to dV and thereafter, decreases the quiescent output voltage level back to its original value. As the output capacitor discharges down to its original quiescent levels, the switching power supply will temporarily cease providing an output pulse waveform to charge to output capacitor. In other words, to allow the output capacitor to discharge, the power supply will interrupt its switching operation. A second function detects when the switching power supply resumes switching after the voltage across the capacitors has decreased to its original level. In this way, the time required for the output capacitor to discharge an amount of current which changes the voltage across the capacitor by an amount equal to dV can be measured.

In order to detect clogged ink jets, the method and system of the invention can also utilize the printing of a prime pattern. Thereafter, an operator can visually examine the prime pattern and determine which ink jets, if any, are nonfunctional. The operator can then manually input the reference designation or address of each nonfunctional ink jet into the open jet list, for example. As described above, this open jet list may be used to update print masks stored within a memory of the ink jet printer, or notify the operator when a particular printhead cartridge has an unacceptable number of nonfunctional ink jets.

In one embodiment of the invention, an ink jet printer system for detecting a nonfunctional element in an ink jet printhead, includes: a switching power supply, coupled to the inkjet printhead, for supplying power to the printhead; an output capacitor, coupled to an output of the switching power supply, for storing a dc voltage therein; a bleed resistor, coupled in parallel to the output capacitor, for discharging current from the output capacitor; an output shifting circuit, coupled to the switching power supply, for shifting the dc voltage level across the output capacitor from a low state to a high state; and a sensor, coupled to the output of the switching power supply, for detecting when the switching power supply is switching, wherein an element of the printhead is tested by measuring a test current discharging from the output capacitor when the element is activated and comparing the measured test current with a reference current which discharges from the output capacitor through the bleed resistor.

In another embodiment, an ink jet printer system for detecting a nonfunctional element in an ink jet printhead, includes: means for supplying regulated power to the printhead; capacitor means, coupled to the means for supplying regulated power, for storing a dc voltage therein; discharge means for discharging current from the capacitor means; means for shifting the dc voltage level stored in the capacitor means from a low state to a high state; means for measuring a test current discharging from the capacitor means when an element of the printhead is activated; and means for comparing the measured test current with a reference current which discharges from the capacitor means through only the discharge means when no element of the printhead is activated.

In a further embodiment, a method of detecting a nonfunctional element in an ink jet printhead includes the acts of: supplying regulated power to the printhead; storing the regulated power in a capacitor so as to provide a dc voltage across the capacitor; shifting the dc voltage level stored in the capacitor from a low state to a high state; measuring a test current discharging from the capacitor when an element of the printhead is activated; measuring a reference current discharging from the capacitor through a bleed resistor, when no elements of the printhead are activated; and comparing the measured test current with the reference current.

DETAILED DESCRIPTION OF THE INVENTION

The invention is described in detail below with reference to the figures, wherein like elements are referenced with like numerals throughout.

Figure 1:
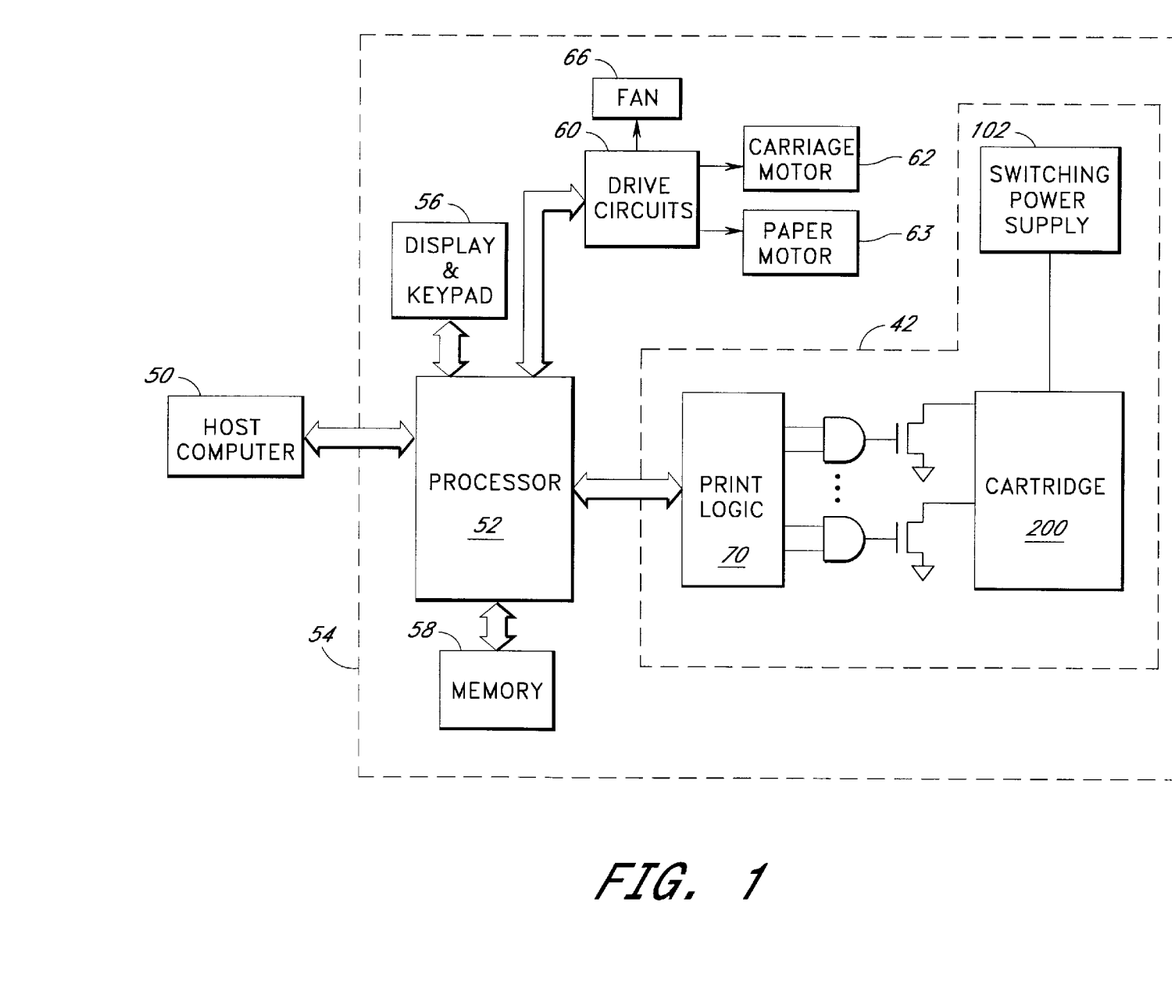
FIG. 1 is a block diagram illustrating the electrical components within an ink jet printer system.

Referring to FIG. 1, various components of a typical ink jet printer 54 are illustrated. These various components include the control electronics inside the ink jet printer 54 which are used to control ink droplet ejection from the ink jets of a printhead cartridge 200, located within a printhead carriage 42. A host computer 50 communicates with a processor 52 integral with the ink jet printer 54. The host computer 50 runs driver software which issues print commands and sends data to the ink jet printer. As in conventional ink jet printers, the processor 52 communicates with a display and keypad 56, memory 58, and drive circuits 60 which control the print carriage motor 62 and paper motor 63 as well as powering a fan 66. In addition, the processor 52 routes signals to print logic 70, which actuates the ink jets of each printhead cartridge 200 located within the printhead carriage 42. The ink jet printer 54 further includes a switching power supply 102, coupled to the printhead cartridge 200 of the printhead carriage 42, which provides power to fire each individual ink jet of the cartridge 200. The system comprising the switching power supply 102 and the printhead cartridge 200, coupled to the output of the power supply 102, is described in further detail below with reference to FIG. 2.

The processor 52, in accordance with internal firmware stored in a portion of the memory 58, selectively ejects ink droplets from the ink jets of each cartridge 200. The programming of the processor thus determines which ink jet of the printhead cartridge 200 is assigned to be used to eject an ink droplet onto any given grid location of the printed image when the relevant swath being printed calls for a droplet at that given grid location. In multi-pass printing, for example, the set of nozzle to grid location assignments is commonly referred to as a print mask, and the print mask definition is stored in memory 58 in the ink jet printer 54.

Figure 2:
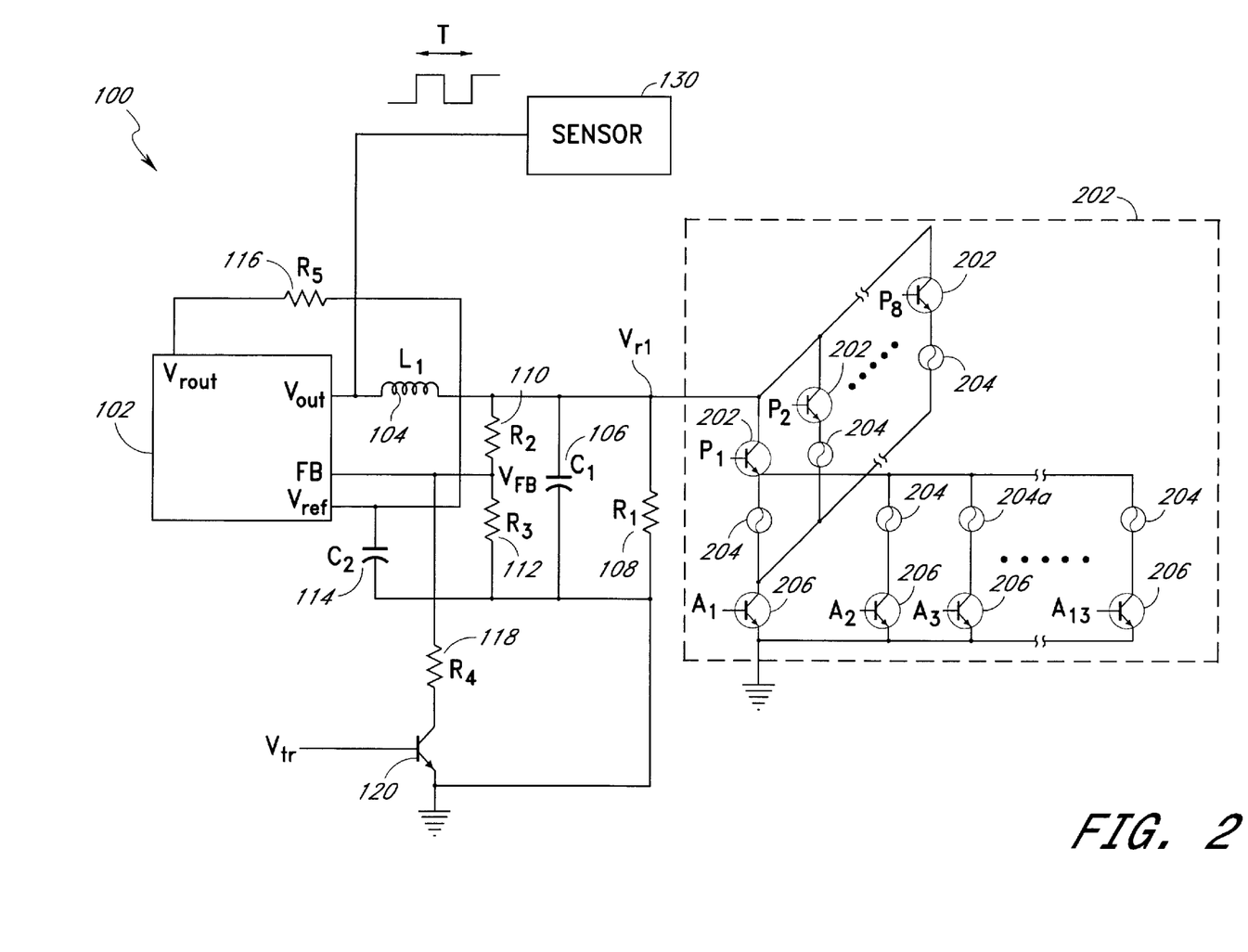
FIG. 2 illustrates a schematic diagram of a circuit, coupled to an ink jet printer cartridge, which is used to determine if one or more ink jets in the cartridge is nonfunctional, in accordance with one embodiment of the invention.

Referring to FIG. 2, a schematic diagram of a circuit for open jet detection in accordance with one embodiment of the invention, is illustrated. The circuit 100 includes the switching power supply 102 of FIG. 1 which outputs a pulse square wave ($V_{out}$) to an inductor ($L_1$) 104, coupled to the output of the power supply 102. Coupled to the inductor ($L_1$) 104 is a capacitor ($C_1$) 106 which, together with the output inductor ($L_1$) 104 forms a low-pass filter for the output of the switching power supply 102. As shown in FIG. 2, the output ($V_{out}$) of the switching power supply 102 is a pulse square wave having a period T. The low-pass filter, comprising the inductor ($L_1$) 104 and the output capacitor ($C_1$) 106, converts this output pulse square wave into a dc output voltage ($V_C$) which is stored in the output capacitor ($C_1$) 106. An output "bleed" resistor ($R_1$) 108 is coupled in parallel with the output capacitor ($C_1$) 106, and provides a slow current drain which discharges the output capacitor ($C_1$) 106 at a rate which is inversely proportional to the value of the resistance of the bleed resister ($R_1$) 108. Switching power supplies and low-pass output filters such as those described above, and their principles of operation, are well-known in the art. Therefore, a detailed discussion of the function and operation of the switching power supply 102 and the low-pass output filter, comprising the inductor ($L_1$) 104 and the capacitor ($C_1$) 106, is not provided here.

In order to regulate the output voltage $V_{out}$ of the switching power supply 102 and hence, the dc output voltage $V_C$ present on the capacitor ($C_1$) 106, a feedback circuit is coupled to a feedback port (FB) on the switching power supply 102. The feedback circuit includes a resistor divider network coupled in parallel to the capacitor ($C_1$) 106, which divides the dc output voltage ($V_C$) into a desired feedback voltage ($V_{FB}$) which is then applied to the feedback port of the switching power supply 102. The feedback network consists of a second resister ($R_2$) 110 and a third resistor ($R_3$) 112. As is well-known in the electronics arts, the magnitude of ($V_{FB}$) is related to the values of $V_C$, $R_2$ and $R_3$ by the following equation:

$$V_{FB}=V_{R1}\times[R_3\div(R_2+R_3)]$$ Equation 2

In order to regulate the dc output voltage ($V_C$), the feedback voltage ($V_{FB}$), which is directly proportional to the dc output voltage ($V_C$), is compared to a reference voltage ($V_{REF}$) to determine whether the output voltage ($V_C$) is within a desired voltage range. The reference voltage ($V_{REF}$) is provided by a reference capacitor ($C_2$) 114 which is connected in series with a compensation resistor ($R_5$) 116 which in turn is coupled to a reference voltage output source ($V_{ROUT}$) of the switching power supply 102. The switching power supply 102, the low-pass filter comprising ($L_1$) 104 and ($C_1$) 106, the voltage-divider resistor network comprising ($R_2$) 110 and ($R_3$) 112, and the feedback regulation scheme briefly described above, are well-known in the art and, therefore, need not be further described herein. The switching power supply 102 may be any commercially available power supply which can provide the desired regulated dc output voltage ($V_C$). In one embodiment, the desired output voltage ($V_C$) is 13.5 volts at 8 amps, and the values of the various above-described discrete components are provided in the following table:

| $L_1$ | $C_1$ | $R_1$ | $R_2$ | $R_3$ | $R_4$ | $C_2$ | $R_5$ |
|---|---|---|---|---|---|---|---|
| 10 µH | 400 µF | 1 KΩ | 1.65 KΩ | 1 KΩ | 100 KΩ | 2.2 µF | 30 KΩ |

Coupled to the dc regulated output voltage ($V_C$) of the switching power supply 102 is the printhead cartridge 200 of FIG. 1 having eight power lines $P_1$–$P_8$. Each power line $P_1$–$P_8$ is activated by a corresponding switch 202 which provides electrical connectivity between the dc output ($V_C$) of the switching power supply and a respective ink jet 204. Each of the ink jets 204 are further coupled to a respective address line $A_1$–$A_{13}$ each of which are "turned on" by a respective switch 206 which opens and closes to provide electrical connectivity between electrical ground and each of the ink jets 204. In one embodiment, each of the switches 202 and 206 corresponding to the power lines and the address lines, respectively, are bipolar NPN transistors and N-FET transistors, respectively.

Figure 3:
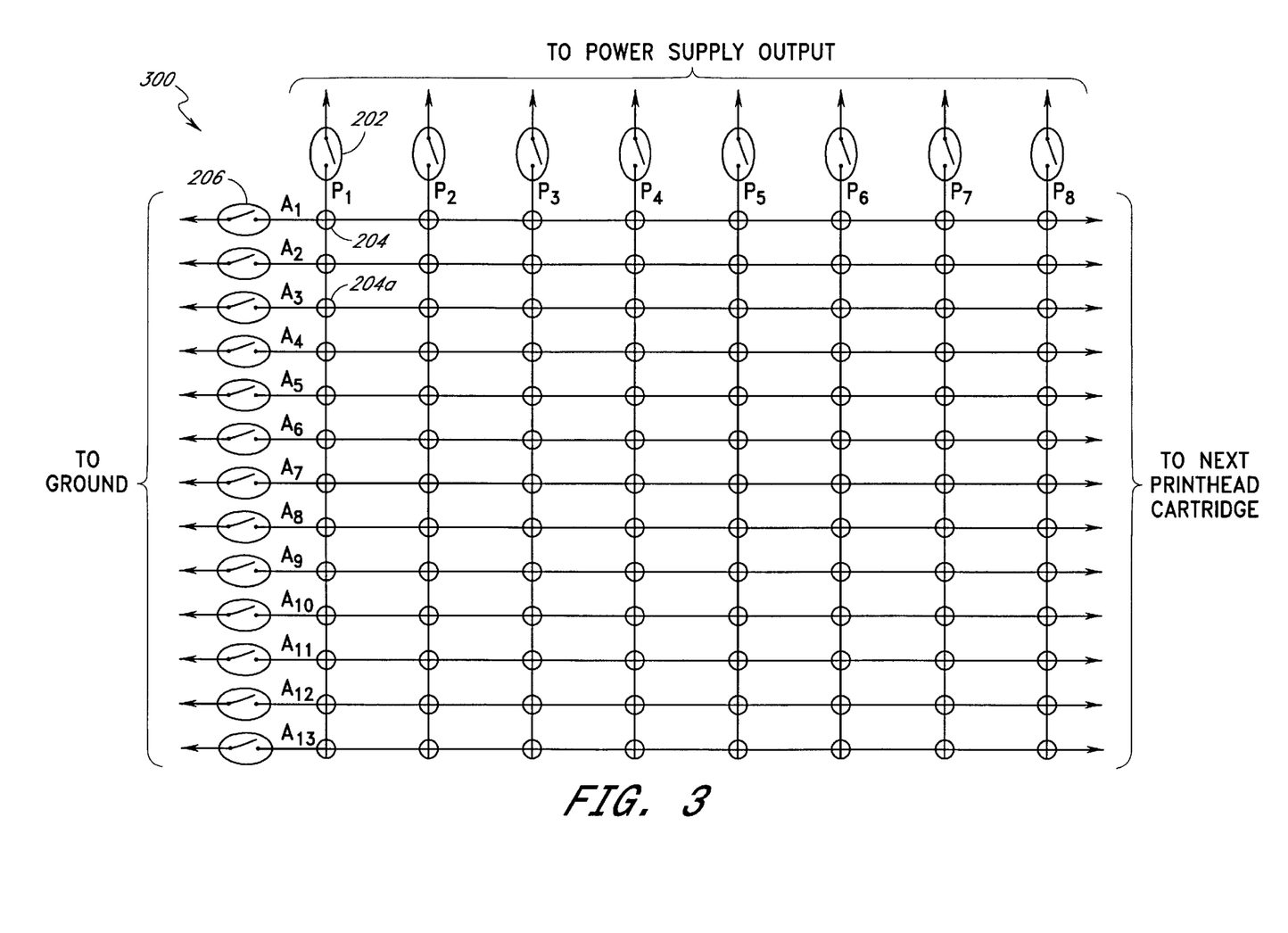
FIG. 3 illustrates an ink jet matrix which exemplifies the relationship between each ink jet in an ink jet cartridge and their corresponding power lines and address lines.

As shown in FIGS. 2 and 3, each power line $P_1$–$P_8$ has associated therewith 13 ink jets 204. Each of the 13 ink jets 204 for each power line $P_1$–$P_8$ is coupled to a respective address line $A_1$–$A_{13}$, providing a total of 104 (8×13) ink jets 204. In order to "fire" an ink jet 204, its corresponding power line and address line must be simultaneously on so as to provide a conduction path from the dc regulated output voltage ($V_C$) of the power supply 102 to electrical ground, thereby closing the circuit for the respective ink jet 204. For example, if it is desired to fire ink jet 204a as shown in FIG. 2, the switch 202 corresponding to power line 1 ($P_1$) must be closed as well as the switch 206 corresponding to address line 3 ($A_3$). Only then will the ink jet 204a be caused to fire. As described above, the switches 202 corresponding to the power lines $P_1$–$P_8$ and the switches 206 corresponding to the address lines $A_1$–$A_{13}$ may be bipolar NPN transistors which are activated by providing a specified current to their bases. However, other types of transistors and/or switches may be used to activate the respective power or address lines, in accordance with the invention.

Referring to FIG. 3, an ink jet matrix 300, corresponding to the printhead cartridge 200 of FIG. 2, is illustrated. The ink jet matrix 300 illustrates the relationship between each ink jet 204 and its corresponding power and address lines. Each of the power lines $P_1$–$P_8$ is turned on and off depending on whether an ink jet 204 corresponding to the respective power line is desired to be fired. Similarly, each of the address lines $A_1$–$A_{13}$ is turned on and off depending on whether an ink jet 204 corresponding to the respective address line is desired to be fired. FIG. 3 further illustrates that, in order to fire ink jet 204a, for example, the switch 202 corresponding to power line $P_1$ and the switch 206 corresponding to the address line $A_3$ must both be closed so as to provide a closed electrical circuit from the dc output of the power supply to electrical ground for that particular ink jet.

FIG. 3 is not an electrical circuit schematic diagram, but rather, an illustration of the correspondence between a power line and an address line for each respective ink jet 204. Furthermore, the ink jets 204 are not necessarily arranged on a printhead cartridge 200 (FIG. 1) in a matrix configuration as shown in FIG. 3. Nor are the ink jets 204 directly connected to adjacent ink jets 204 as suggested by FIG. 3. Rather, in a preferred embodiment, each ink jet 204 is independently coupled to its respective power and address line such that the firing of one ink jet does not affect the firing of an adjacent ink jet. As shown in FIG. 3, each of the power lines $P_1$–$P_8$ is coupled to the dc output of the switching power supply 102 of FIG. 2. Correspondingly, each of the address lines $A_1$–$A_{13}$ is coupled to ground. In one embodiment, each printhead cartridge 200 includes its own separate and independent power lines $P_1$–$P_8$. However, the address lines $A_1$–$A_{13}$ are common to all the printhead cartridges 200 within a printhead carriage 42 (FIG. 1). Therefore, as shown in FIG. 3, each of the address lines $A_1$–$A_{13}$ continue on toward the next printhead cartridge 200.

Referring once again to FIG. 2, the open jet compensation circuit 100 further includes a pull-down resistor ($R_4$) 118 and a pull-down switch 120, coupled in series with the pull-down resistor 118. In one embodiment, the pull-down switch 120 is a bipolar NPN transistor. As shown in FIG. 2, the pull-down resistor ($R_4$) 118 and the pull-down switch 120 are coupled to the voltage-divider resistor network such that they are connected in parallel with the third resistor ($R_3$) 112.

The regulated dc output voltage ($V_C$) may be incremented by a desired amount by closing the switch 120 and thereby pulling down the magnitude of the feedback voltage ($V_{FB}$) which is applied to the feedback port (FB) of the switching power supply 102. By turning on the transistor 120, an electrical conduction path is provided between the pull-down resistor (R4) 118 and the circuit ground, thereby effectively adding the pull-down resistor (R4) 118 in parallel with the third resistor (R3) 112 of the voltage-divider resistor network. By adding the pull-down resistor ($R_4$) 118 in parallel with the third resistor ($R_3$) 112, the effective feedback resistance ($R_{FB}$) is decreased. The value of the effective feedback resistance ($R_{FB}$) is governed by the following equation:

$$\frac{1}{R_{FB}} = \frac{(R_3 + R_4)}{(R_3 \times R_4)} \qquad \text{Equation 3}$$

Because the feedback voltage ($V_{FB}$) is directly proportional to the effective feedback resistance ($R_{FB}$), a decrease in ($R_{FB}$) leads to a proportional decrease in ($V_{FB}$). When the feedback voltage ($V_{FB}$) is decreased by turning on the pull-down transistor 120, thereby decreasing the feedback resistance $R_{FB}$, the switching power supply 102 compensates for this decrease in feedback voltage by increasing the regulated dc output voltage ($V_C$). The switching power supply does this by increasing its "switching duty cycle," i.e., providing a longer pulse waveform to the low-pass filter comprising the output inductor (L1) 104 and the output capacitor ($C_1$) 106. The pulse square wave begins charging the output capacitor ($C_1$) 106, thereby raising the voltage level ($V_C$) across the capacitor ($C_1$) 106. The switching power supply 102 continues to provide the pulse waveform output signal to the low-pass filter until the regulated output voltage ($V_C$) is stabilized at a new higher voltage level. The output voltage ($V_C$) increases until the directly proportional feedback voltage ($V_{FB}$) reaches its previous voltage levels prior to the pull-down transistor 120 being turned on. At this point, the regulated output voltage ($V_C$) becomes stabilized at its new higher value and the switching power supply 102 temporarily ceases switching.

After the regulated dc output voltage ($V_C$) has been elevated to its new voltage level, it may then be decreased to its original voltage level by turning off the transistor 120. By turning off the transistor 120 the effective feedback resistance once again resumes its original higher value which is equal to the resistance of third resistor ($R_3$) 112. This in turn increases the feedback voltage level ($V_{FB}$) which indicates to the switching power supply 102 that the output voltage level ($V_C$) is too high. At this point, the power supply 102 is not providing a pulse waveform to the low-pass filter, and therefore, the voltage across the output capacitor ($C_1$) 106 is decreasing as current discharges from the capacitor ($C_1$) 106. When no ink jets 204 are being fired, or no power lines $P_1$–$P_8$ or address lines $A_1$–$A_{13}$ are turned on, the output capacitor ($C_1$) 106 slowly discharges through the effective output resistance, comprising the series resistors $R_2$ 110 and $R_3$ 112 of the voltage divider network, coupled in parallel with the bleed resistor ($R_1$) 108, at a rate which is proportional to the capacitance value of the output capacitor ($C_1$) 106 and inversely proportional to the effective output resistance.

Figure 4:
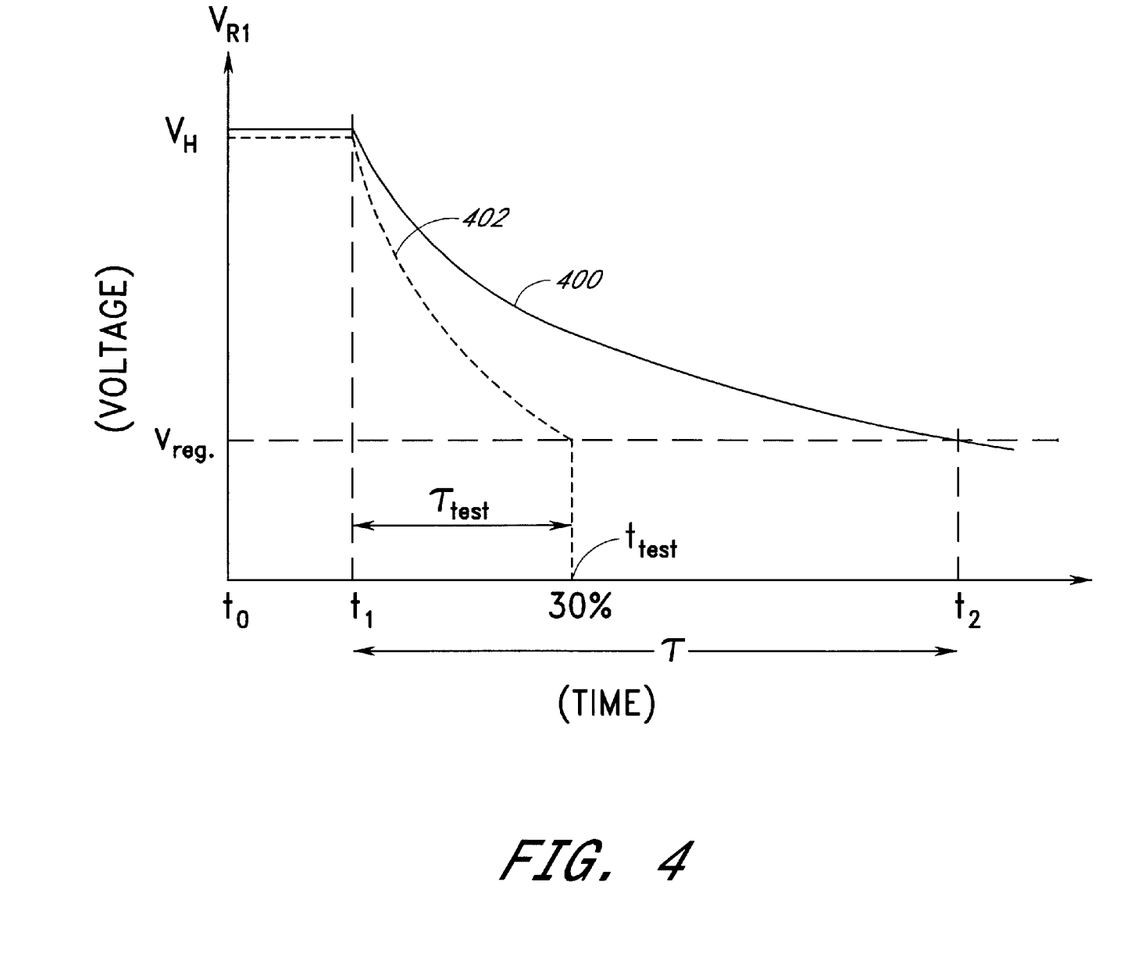
FIG. 4 is a response curve which illustrates a decrease in voltage level across an output capacitor as the capacitor discharges.

Referring to FIG. 4, a voltage response curve illustrating the discharge of the output capacitor ($C_1$) 106 (FIG. 2), is shown. The vertical axis of the voltage response curve indicates the magnitude of the regulated dc output voltage ($V_C$) and the horizontal axis of the response curve indicates time. At a time $t_0$ the regulated output voltage is in a stabilized, elevated state, indicated by $V_H$, and the pull-down transistor 120 (FIG. 2) is turned on. At time $t_1$, the transistor 120 is turned off, thereby increasing the effective feedback resistance $R_{FB}$ to its original value of $R_3$ 112. This proportionally increases the feedback voltage level $V_{FB}$ which in turn indicates to the switching power supply 102 that the regulated output voltage $V_C$ is too high. At this point, the switching power supply 102 is not providing a pulse square wave output signal to the inductor ($L_1$) 104 and capacitor ($C_1$) 106 (FIG. 2) and the switching power supply is effectively turned off.

From $t_1$ to $t_2$, the output capacitor ($C_1$) 106 discharges at a rate which is inversely proportional to the resistance at the output of the switching power supply 102. The voltage decay resulting from the discharge of the output capacitor ($C_1$) 106 when no ink jets are being fired, and no power or address lines are turned on, is indicated by the response curve 400. When no ink jets 204 are being fired, and no address or power lines are turned on, the effective output resistance of the switching power supply 102 is equal to ($R_1$) 108, coupled in parallel with the sum of the series resistors $R_2$ 110 and $R_3$ 112. However, for purposes of the following discussion, we will treat the effective output resistance as being essentially equal to the bleed resistor ($R_1$) 108. This approximation does not change the analysis provided below. The time required for the output capacitor ($C_1$) 106 to discharge through the bleed resistor ($R_1$) 108, such that the regulated output voltage ($V_C$) decreases from ($V_H$) to ($V_{REG}$), is illustrated as $\tau = t_2 - t_1$. $\tau$ is referred to herein as the reference discharge time period.

By measuring the reference discharge time period $\tau$ required for the output voltage ($V_C$) to decrease from a value of $V_H$ to $V_{REG}$, a reference value which is inversely proportional to the amount of current drawn from the output of the switching power supply 102 is obtained. This output reference current ($I_{REF}$) indicates the amount of current pulled from the switching power supply 102 when no ink jets 202 are being fired, i.e., all power lines $P_1$–$P_8$ and all address lines $A_1$–$A_{13}$ are turned off. This reference discharge period is measured from the point when the pull-down transistor 120 (FIG. 2) has been turned back off at time $t_1$, after the output voltage $V_C$ has stabilized at its new higher value $V_H$, until the point in time when the switching power supply resumes switching, i.e., outputing a pulse waveform, at time $t_2$. A sensor 130 coupled to the output of the switching power supply 102 detects the pulse waveform output (Vout) of the switching power supply 102 at time $t_2$ and records the time of detection. The sensor 130 may be any one of numerous circuits which are capable of detecting a pulse waveform and which are well-known in the art.

Similar to the method of obtaining the reference discharge period described above, a test discharge period may be obtained for each of the following conditions: (1) when only a power line $P_1$–$P_8$ is turned on; (2) when only an address line $A_1$–$A_{13}$ is turned on; and (3) when a jet is turned on (i.e., its corresponding power line and address line is simultaneously turned on). In one embodiment, the above-described test discharge period $\tau_{test}$ is measured for each of the power lines $P_1$–$P_8$, each of the address lines $A_1$–$A_{13}$, and each of the ink jets 204 one at a time. For example by turning on each power line $P_1$–$P_8$ one at a time, without turning on any of the address lines $A_1$–$A_{13}$, each of the power lines $P_1$–$P_8$ may be individually tested. Thus, each element of a printhead cartridge 200 may be individually tested.

As discussed above, in order to fire an ink jet 202, a corresponding power line and address line must be simultaneously on to create a closed circuit which is electrically coupled between the output of the switching power supply 102 and electrical ground. Only then does the switching power supply 102 provide the desired voltage and current across the respective ink jet to be fired. Therefore, when a power line is turned on without turning on any address line, ideally, there should not be a closed circuit coupled to the output of the switching power supply 102 and, consequently, there should be no additional current draw from the capacitor ($C_1$).

By successively turning on each power line, one at a time, with the turning off of the pull-down transistor 120 at time $t_1$, it can be determined whether a power line, by itself, is drawing additional current from the power supply 102 when it is turned on. Since there should be no additional current draw from a single power line when no address lines are simultaneously on, the test discharge period $\tau_{test}$ should be equal to the reference discharge period $\tau$. However, if the test discharge period $\tau_{test}$ is measured to be substantially shorter than the reference discharge period $\tau$, this necessarily indicates that additional current is being drawn by the tuning on of that respective power line. As shown in FIG. 4, if the test voltage response curve 402 falls to $V_{reg}$ in an amount of time indicated by $\tau_{test}$ which is substantially shorter than $\tau$, the respective power line is determined to have a short circuit and/or an undesired closed circuit to electrical ground associated with that power line. In one embodiment, if the test discharge period $\tau_{test}$ is less than 30% of the reference discharge period $\tau$, the respective power line is determined to be defective, or nonfunctional.

In the circuit illustrated in FIG. 2, the tuning on of a power line is accomplished by providing a voltage pulse to the corresponding NPN transistor 202 for that power line. In one embodiment, the pulse for turning on a respective power line during testing of the power line has a duty cycle which is 16 times that of a pulse which is used to turn on the power line during actual firing of an ink jet during normal operation of the ink jet printer 54 (FIG. 1). As explained in further detail below, the ¹⁄₁₆th duty cycle of the "actual" pulse which is used to fire an ink jet 204 when compared to the "test" pulse which is used during testing of the power line, must be compensated for by dividing any measured current drawn by a power line during testing by a factor of 16. This increase in duty cycle of the test pulse allows adequate time for the output capacitor ($C_1$) 106 to discharge by an amount proportional to dV during testing of the power lines. Additionally, the increased duty cycle allows a more accurate measurement of the characteristics of the power lines.

After all the power lines $P_1$–$P_8$ have been tested, each address line $A_1$–$A_{13}$ can be tested one at a time in a similar fashion to the testing of each power line $P_1$–$P_8$ as described above. The procedure for testing an address line may be identical to the procedure for testing a power line and, therefore, need not be repeated here.

From Equation 1 above, we know that the average current pulled from the switching power supply is given by the equation $I_{average}=C\times(dV/dT)$, where C is the output capacitance value of the capacitor ($C_1$) 106, dV is a change in voltage of the regulated dc output voltage ($V_C$) as the capacitor 106 discharges, and dT is the time measured for the voltage change to occur. From this equation, we see that the current drawn from the output capacitor ($C_1$) 106 is inversely proportional to the time period dT required to discharge the output capacitor ($C_1$) 106 as the output voltage changes by an amount equal to dV. With this relationship between the current and the discharge period in mind, it is possible to calculate the average current output of the capacitor ($C_1$) 106 by measuring the time period required for the voltage across the capacitor to change from ($V_H$) to ($V_{REG}$).

By conducting a nodal analysis at the output of the switching power supply 102 of FIG. 2, the following equation is obtained:

$$I_{total}=I_{jet}+I_p+I_a+I_{ref} \qquad \text{Equation 4}$$

where $I_{total}$ is the total amount of current drawn from the output capacitor ($C_1$) 106 when an ink jet is fired, $I_{jet}$ is the amount of current drawn by only a single ink jet when it is fired, $I_p$ is the amount of current drawn by only a single power line when it is turned on (note that a properly functioning power line should draw negligible current), $I_a$ is the amount of current drawn by only a single address line when it is turned on (note that a properly functioning address line should draw negligible current), and $I_{ref}$ is the amount of current that is drawn by the "bleed" resistor ($R_1$) 108.

By rewriting the above equation in terms of discharge periods which are inversely proportional to their respective currents, the following equation is obtained:

$$\frac{1}{J_m} = \frac{1}{J_a} + \frac{1}{P_a} + \frac{1}{A_a} + \frac{1}{\tau} \qquad \text{Equation 5}$$

where $J_m$ is equal to the measured discharge period when a single ink jet is fired, $J_a$ represents the discharge period which is inversely proportional to the actual current drawn by only a single ink jet when it is fired, $P_a$ represents the discharge period which is inversely proportional to the actual current drawn by only a single power line when it is turned on, $A_a$ represents the discharge period which is inversely proportional to the actual current drawn by only a single address line when it is turned on, and $\tau$ is equal to the reference discharge period (FIG. 4) which is inversely proportional to the amount of current drawn by the bleed resistor 108.

Because the bleed resistor 108 continuously draws current from the capacitor ($C_1$) 106, any measured values of current drawn by firing only a single power line, or only a single address line, or by firing an ink jet, must take into consideration the continuous current drawn by the bleed resistor 108. With this in mind, we obtain the following equation with respect to the measured current drawn from the switching power supply when only a single address line is turned on:

$$\frac{1}{A_m} = \frac{1}{A_a} + \frac{1}{\tau} \qquad \text{Equation 6}$$

where $A_m$ represents the measured discharge period required for the capacitance voltage to change by an amount dV when only a single address line is turned on. Note that the contribution from the discharge of the capacitor ($C_1$) 106 through the bleed resistor ($R1$) 108 is represented by $1/\tau$. From Equation 6, we can obtain the actual current drawn by the address line as follows:

$$\frac{1}{A_a} = \frac{1}{A_m} - \frac{1}{\tau} \qquad \text{Equation 7}$$

Similarly, the measured current drawn when only a single power line is turned on is represented by the following equation:

$$\frac{1}{P_m} = \frac{16}{P_a} + \frac{1}{\tau} \qquad \text{Equation 8}$$

where $P_m$ is the measured discharge period for the capacitance voltage ($V_c$) to change by an amount dV when only a single power line is turned on. As explained above, the fact that $$\frac{1}{P_a}$$

is multiplied by a factor of 16 is due to the fact that during the test mode the power line is turned on for a duration which is 16 times the duration that the power line is turned on when firing an ink jet during normal operation of the ink jet printer. In other words, during actual operation of the ink jet printer, an ink jet is fired by "pulsing" the power line at a duty cycle which is 1/16th of the duty cycle of the power line during testing of the printhead. From the above equation, we can obtain an equation which represents the actual current drawn by firing only a single power line as follows:

$$\frac{1}{P_a} = \frac{1}{16 P_m} - \frac{1}{16\tau} \qquad \text{Equation 9}$$

By rearranging Equation 5 above, we obtain the following equation:

$$\frac{1}{J_a} = \frac{1}{J_m} - \frac{1}{P_a} - \frac{1}{A_a} - \frac{1}{\tau} \qquad \text{Equation 10}$$

By plugging in the values for $$\frac{1}{A_a}$$

and $$\frac{1}{P_a}$$

obtained above, the following equation is obtained:

$$\frac{1}{J_a} = \frac{1}{J_m} + \frac{1}{16\tau} - \frac{1}{16 P_m} - \frac{1}{A_m} \qquad \text{Equation 11}$$

As explained above, $J_m$ equals the measured amount of time required to discharge the capacitor ($C_1$) 106 such that its voltage level drops by an amount equal to dV when a single ink jet is fired. $\tau$ represents the amount of time dT required for the voltage capacitance to decrease by an amount equal to dV when no elements of the printhead cartridge are activated. $P_m$ is the measured time period required for the capacitor to discharge by an amount equal to dV when a single power line is turned on. And finally, $A_m$ is the measured amount of time required for the capacitance to discharge by an amount equal to dV when only a single address line is turned on. By measuring each of these values individually, a value for $$\frac{1}{J_a}$$

may be obtained. As discussed above, $$\frac{1}{J_a}$$

is directly proportional to the actual amount of current which is drawn from the switching power supply by only a single ink jet when that ink jet is fired, not including any current drawn by the bleed resistor 108, nor any defective address or power lines. By obtaining the actual amount of current pulled by only a single ink jet, a determination may be made as to whether that ink jet is defective, e.g., its drop ejection resistor is damaged, irrespective of whether the power line or address line for that ink jet is in proper working order.

Thus, the invention provides a method and system in which the actual current drawn from the output capacitor ($C_1$) 106 when a single ink jet is fired (assuming that its corresponding power lines and address lines are in proper working condition) may be provided by $$\frac{1}{J_a}.$$

Additionally, the amount of current drawn from the output capacitor ($C_1$) 106 when only a single power line is turned on is represented by $$\frac{1}{P_a}.$$

Finally, the amount of current drawn from the switching power supply 102 when only a single address line is turned on may be obtained from $$\frac{1}{A_a}.$$

After these values are obtained, they may be compared to threshold values or ranges in order to determine whether they fall within these threshold values or ranges. If they do not, then in one embodiment, an error message is provided by an LCD screen which is typically found on most ink jet printers today, indicating either a failed power line, a failed address line, or a failed ink jet, as desired by the designer and/or manufacturer of the ink jet printhead cartridge. By obtaining these values, it can be determined whether an ink jet printer has a defective power line, or a defective address line, or whether the ink jet nozzle itself is defective. The comparison of the values $J_a$, $P_a$ and $A_a$ to the threshold values or ranges may be accomplished by any circuit which is well-known in the electronics arts.

In one embodiment, the above-described measurements are conducted for each address line and each power line, and each ink jet at the startup of the ink jet printer operation. For example, each power line $P_1$–$P_8$ is successively turned on in order to measure the value of the discharge period $P_m$ for each respective power line. Similarly, each address line $A_1$–$A_{13}$ is successively turned on in order to measure the discharge period $A_m$ for each respective address line. Finally, each ink jet in a printhead cartridge is successively fired in order to measure the discharge period $J_m$ for each individual ink jet in the printhead cartridge. By obtaining the measured values for each power line, each address line, each ink jet and the measured reference discharge period, we can obtain the values for $A_a$, $P_a$, and $J_a$, as described above. Based on these values for $J_a$, $P_a$ and $A_a$, the method and system of the present invention is capable of distinguishing between a failed power line, a failed address line, or a failed ink jet, for example. After a defective, or failed, element of the ink jet printer has been identified in this manner, appropriate actions may then be taken to repair, replace or compensate for the damaged element.

A significant advantage of the method and system of the invention is that unlike prior art methods and systems, no series current sensing element (i.e., resistor), is used. Instead, the method and system of the invention measures the time it takes for capacitors supplying power to the ink jet cartridges to discharge by a small amount. In one embodiment, measurement sequence is as follows:

1. Command the output voltage of the switching power supply to shift up by dV and allow it to reach the new value. This may be accomplished by turning on the pull-down transistor 120 (FIG. 2) as described above.
2. Activate circuitry to be measured (e.g., the jet under test) or do not activate any element if a reference discharge period $\tau$ is to be measured.
3. Command the output voltage of the switching power supply to shift down and start the time measurement. This may be accomplished by turning off the pull-down transistor 120, as described above. The switching power supply will not start switching until the output voltage drops to the commanded value.
4. When the switching power supply resumes switching, record the time measurement. This will be the measured discharge period which is inversely proportional to the amount of current discharged from the output capacitor $C_1$ 106.

This technique can be used to measure the quiescent state (i.e., when no elements are activated), test the printhead cartridge address lines, test the printhead cartridge power lines, test each ink jet in the test printhead cartridge, test the printhead cartridge heaters, or test any combination of these. The measurement of the quiescent state is accomplished by measuring the reference discharge period and is used as a reference point to calibrate the other measurements.

As described above, the invention provides a method and system in which the current required to fire an ink jet is not measured by measuring the voltage drop across a series resistor, but rather, by measuring the discharge rate of an output capacitor connected to an output of a switching power supply as one or more elements of the ink jet printer are activated. This eliminates the need for series resistors which dissipate heat and energy, take up space on the printhead carriage 42, and make the overall operation of the printhead carriage 42 less efficient and its manufacture more costly. Additionally, by measuring the discharge rate-of the output capacitor after an ink jet has been fired, or after a power line to the ink jet has been turned on, or after an address line to the ink jet has been turned on, and comparing these test discharge rates with a reference discharge rate, the invention provides a way to determine if there is a defective ink jet, a defective power line, or a defective address line, for example, and also distinguish between these types of failures.

The invention may be embodied in other specific forms without departing from its spirit or essential characteristics. The described embodiments are to be considered in all respect only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. An ink jet printer system for detecting a nonfunctional element in an ink jet printhead, comprising:

a switching power supply, coupled to the inkjet printhead, for supplying power to the printhead;

an output capacitor, coupled to an output of the switching power supply, for storing a dc voltage therein;

a bleed resistor, coupled in parallel to the output capacitor, for discharging current from the output capacitor;

an output shifting circuit, coupled to the switching power supply, for shifting the dc voltage level across the output capacitor between a low state and a high state; and a sensor, coupled to the output of the switching power supply, for detecting when the switching power supply is switching, wherein an element of the printhead is tested by measuring a test current discharging from the output capacitor when the element is activated and comparing the measured test current with a reference current which discharges from the output capacitor through the bleed resistor.

2. The system of claim 1 wherein said output shifting circuit comprises:

a voltage divider network having a first resistor and a second resistor coupled in series with the first resistor, wherein the first resistor is directly coupled to said output capacitor at a first node and the second resistor is directly coupled to the first resistor at a second node, wherein the second node is connected to a feedback port on said switching power supply so as to provide a feedback voltage level to the switching power supply;

a pull-down resistor, coupled to the voltage divider network at the second node; and a pull-down switch, coupled in series with the pull-down resistor, wherein, when the pull-down switch is turned on, said output voltage level increases from its low state to its high state, and when the pull-down switch is turned off, the output voltage level across the output capacitor decreases from its high state to its low state at a rate which is determined by an amount of current discharging from the output capacitor.

3. The system of claim 1 wherein:

said sensor measures said test current by measuring a test discharge period required for said output voltage to decrease from said high state to said low state as a result of said output capacitor discharging current through said element which has been activated, the test discharge period being inversely proportional to the test current; and wherein said sensor measures said reference current by measuring a reference discharge period required for the output voltage to decrease from the high state to the low state as a result of the output capacitor discharging current through the bleed resistor, the reference discharge period being inversely proportional to the reference current.

4. The system of claim 1 wherein said output capacitor is coupled to a plurality of power lines of said printhead, said printhead having a plurality of ink jets, each ink jet corresponding to one of a plurality of power lines and one of a plurality of address lines of the printhead, and wherein, when an ink jet is desired to be tested, its corresponding power line and address line are simultaneously on, when a power line is desired to be tested, only that power line is turned on, and when an address line is desired to be tested, only that address line is turned on.

5. An ink jet printer system for detecting a nonfunctional element in an ink jet printhead, comprising:

means for supplying regulated power to the printhead;

capacitor means, coupled to the means for supplying regulated power, for storing a dc voltage therein;

means for discharging current from the capacitor means;

means for shifting the dc voltage level stored in the capacitor means between a low state and a high state;

means for measuring a test current discharging from the capacitor means when an element of the printhead is activated; and means for comparing the measured test current with a reference current which discharges from the capacitor means through only the means for discharging when no element of the printhead is activated.

6. The system of claim 5 wherein said means for measuring a test current comprises sensor means for detecting when the means for supplying power is providing a predetermined output signal.

7. The system of claim 5 wherein said means for shifting comprises:

means for dividing said dc voltage level by a desired amount so as to provide a feedback voltage to said means for supplying power which is representative of said output voltage level; and means for adjusting the means for dividing such that said output voltage level is adjustable from its low state to its high state and vice versa.

8. The system of claim 5 wherein:

said means for measuring said test current includes means for measuring a test discharge period required for said dc voltage level to decrease from said high state to said low state as a result of said capacitor means discharging current through an activated element, the test discharge period being inversely proportional to the test current: and wherein said means for measuring said reference current includes means for measuring a reference discharge period required for the dc voltage level to decrease from the high state to the low state as a result of the capacitor means discharging current through said discharging means, the reference discharge period being inversely proportional to the reference current.

9. A method of detecting a nonfunctional element in a printhead of an ink jet printer, comprising the acts of:

supplying regulated power to the printhead;

storing the regulated power in a capacitor so as to provide a dc voltage across the capacitor;

shifting the dc voltage level stored in the capacitor from a low state to a high state;

allowing the capacitor to discharge such that the dc voltage across the capacitor decreases from the high state to the low state;

measuring a reference current discharging from the capacitor through a bleed resistor, when no elements of the printhead are activated;

measuring a test current discharging from the capacitor when an element of the printhead is activated; and comparing the measured test current with the reference current.

10. The method of claim 9 wherein said act of measuring a test current comprises detecting when a switching power supply is providing an output signal to charge said capacitor, the capacitor being coupled to the output of the switching power supply.

11. The method of claim 10 wherein said act of shifting the dc voltage level comprises:

dividing said dc output voltage level by a desired amount so as to provide a feedback voltage to said switching power supply which is representative of the dc voltage level; and adjusting the feedback voltage level such that said dc voltage level is adjusted from its low state to its high state.

12. The method of claim 10 wherein:

said act of measuring said test current comprises measuring a test discharge period required for said dc voltage level to decrease from said high state to said low state as a result of said capacitor discharging current through an activated element, the test discharge period being inversely proportional to the test current: and wherein said act of measuring said reference current comprises measuring a reference discharge period required for the dc voltage level to decrease from the high state to the low state as a result of the capacitor discharging current through said bleed resistor, the reference discharge period being inversely proportional to the reference current.

13. An ink jet printer system for detecting a nonfunctional element in an ink jet printhead, without the necessity of adding a separate resistive element in series with the nonfunctional element, said ink jet printer system comprising:

first means for supplying regulated power to said printhead;

second means for storing a predetermined magnitude of charge from said regulated power supply so as to provide a dc voltage;

third means coupled to said second means for discharging at least a portion of said stored charge into a circuit having a fixed reference resistance; and fourth means coupled to said second means for comparing the actual duration of a test discharge period, which corresponds to the time required to discharge at least a portion of said stored charge into said element of said printhead, with a reference discharge period which corresponds to the time required to discharge at least a portion of said stored charge into said circuit having a fixed reference resistance.

14. An ink jet printer system for detecting a nonfunctional jet in an ink jet printhead without the necessity of adding a separate resistive element in series with each of the jets of said printhead for measuring the voltage drop across each of said series resistors to ascertain whether a respective jet of said printhead is properly functioning, said ink jet printer system comprising:

first means for storing a predetermined magnitude of charge;

second means coupled to said first means for discharging said stored charge into a circuit including said ink jet printhead and comparing the actual duration of said discharge period with a predetermined discharge period which corresponds to the circuit when no elements in said ink jet printhead are activated.

* * * * *